May 11, 1965

G. G. LESSMANN ETAL 3,183,066

ARTICLE PRODUCED BY METALS JOINING AND METHOD
FOR PRODUCING SUCH ARTICLE

Filed March 8, 1962

WITNESSES

INVENTORS
Gerald G. Lessmann &
Raymond L. Phebus
BY

ATTORNEY

May 11, 1965 G. G. LESSMANN ETAL 3,183,066
ARTICLE PRODUCED BY METALS JOINING AND METHOD
FOR PRODUCING SUCH ARTICLE
Filed March 8, 1962 5 Sheets-Sheet 5

United States Patent Office 3,183,066
Patented May 11, 1965

3,183,066
ARTICLE PRODUCED BY METALS JOINING AND METHOD FOR PRODUCING SUCH ARTICLES
Gerald G. Lessmann, Pittsburgh, and Raymond L. Phebus, Narberth, Pa., assignors to Westinghouse Electric Corporation, East Pittsburgh, Pa., a corporation of Pennsylvania
Filed Mar. 8, 1962, Ser. No. 178,472
2 Claims. (Cl. 29—193)

This invention relates to the art of metals joining and has particular relationship to articles or assemblies sealed vacuum tight and to methods for producing such articles or assemblies.

In its specific aspects, this invention concerns itself with the making of tubular articles containing heat producing materials which are immersed in heat exchange relationship in water at a high temperature and a high pressure. It is necessary that such articles be sealed fluid-tight against the penetration of the high pressure water into the tubes and to achieve this purpose each article or assembly includes a tube sealed fluid-tight at its ends by plugs. So that the articles shall be capable of withstanding the corrosive effects of the hot water, the tubes and plugs are composed of a material such as stainless steel. The joints between each tube and its plugs are produced by arc welding with a non-consumable electrode in a highly pure inert atmosphere.

Such sealed article in accordance with the teachings of the prior art include plugs each provided with a simple shoulder. Each plug is inserted in the tube with the shoulder abutting the end of the tube and a circular weld is produced by arc welding with a non-consumable electrode. The welding arc is maintained at the junction of the shoulder and the end of the tube. A large proportion of these prior-art assemblies were found to be leaky and otherwise defective in production and because of this these assemblies were highly costly.

It is then broadly, an object of this invention to provide a low cost, reliable tube assembly sealed fluid-tight against high pressure and a method of producing such an assembly.

This invention arises from the discovery that one of the important contributing causes to the difficulties encountered with the prior-art sealed tube assemblies arises from the difference in the heat conduction capability of the tube and the plug. The tube being of relatively thin material, typically between 0.010 and .019 inch, is appreciably less thermally conducting than the plug, the head of which is of solid material. The problems of joining materials differing substantially in thickness have been encountered in the past but the joining of a plug and a tube having differing heat conduction capabilities has peculiar complications which militate against the applicability of earlier experience.

In an attempt to provide reliably sealed tubes at a low cost, an elaborate study of the prior-art practice was conducted. A large number of welds were made with the prior-art plugs and tubes and with a number of welding power supplies used in different ways. The observations of this study may be summarized as follows:

(1) Not all welding power supplies performed satisfactorily. Only two direct-current supplies of four tested provided weld configurations which in production quantities could provide consistent satisfactory weld quality. One of these two "satisfactory" supplies later proved to be marginal.

(2) The best of these power supplies provides satisfactory results only when used in conjunction with a highly sophisticated electronic automatic voltage-sensitive welding head which assures constant arc voltage (constant arc gap). This head had to be set at the lowest possible arc voltage. Welding at low voltage frequently caused electrode shorting requiring time consuming repair passes.

(3) The positioning of the non-consumable electrode directly over the end plug-tube interface was found to be critical. Mis-positioning of the electrode by only a small distance caused high weld rejection rates. Time-consuming effort is then required in setting up the weld.

(4) The apparent simplicity of the design of plug proved to be fictitious since close tolerances were required. It was difficult to find vendors capable of machining these plugs with the tolerances considered necessary to assure weldability.

(5) A particular problem encountered in welding end closures to AISI types 347 and 348 stainless-steel tubes is that of weld cracking. Weld cracking may be minimized by controlling the weld bead composition with regard to ferrite content in the weld structure. The composition of the end plug must then be specially selected for this purpose so that the composite (tube plus end plug material) composition of the weld bead may be controlled. In some cases, specially prepared heats are required to obtain the proper composition. In the prior-art closed tube assemblies, a large proportion of the weld bead is made up of tubing (estimated variation from 30% to 50%) hence cracking occasionally occurs despite careful selection of end plug composition. A disadvantage of such a construction is that too high a proportion of tubing material is fused into the weld zone thus promoting cracking when welding crack-sensitive tubing.

It was realized that the above-described observed difficulties are related to the so-called "mass effect" of the prior-art joint design which exists in welding thin sections to heavier members. During welding the thin section heats and melts rapidly while the heavier section heats and melts relatively slowly. If care is not taken in fit-up of parts and in selection and control of welding parameters, the joint may not fuse thereby causing "peel-back" of the tubing. By precise process control peelback may be minimized. The "mass effect" also manifests itself subtly as a shrinkage defect resulting from the unbalanced weld-bead cooling rate caused by the heat-sink effect of the end plug causing separation of the molten metal of the tube from the plug. The unbalanced cooling causes weld contraction toward the end plug during solidification and a void formation on the tube side of the weld. This defect is not discernible by visual examination but is readily found by radiography. In production many defective end closures are made before such a defect is discovered and the welding procedures corrected.

It is known that in the welding of a thick section to a thin section, the thick section may be reduced by notching or machining a shoulder, in the region of the weld thus minimizing the effect of the thick section in rapidly conducting the heat away from the weld (see Jottrand et al. 874,084, Schickert 993,883, Eden et al. 2,933,593). But, this solution could not be practicably applied to the problem at hand.

Another aspect of this invention involves the build-up of weld metal on the outside of the welded joint as the result of the welding. In many situations the tubes are so arranged that it is essential that the build-up be minimized. It is another object of this invention to provide a sealed tube assembly in which the build-up of the joining metal shall be minimized.

In accordance with this invention in its specific aspects, the closure for the tube is a plug having a land or skirt. In most current situations, the plug has an inner extension which extends or projects into the tube and an outer extension which extends outwardly from the tube. Such plugs are called insert-type plugs and in them the land is interposed between the inner and outer extensions. In other situations the plug, called insertless, has only an extension which projects outwardly from the tube and terminates in the land.

In the practice of this invention, the tube is sealed to the plug by a fluid-tight seal produced by arc welding at the land with a non-consumable, usually thoriated tungsten, electrode in a shield of inert gas, for example, helium. Prior to the welding, the plug and the tube are engaged. If the plug is of the insert type, the inner extension is slipped into the tube and the land engages the rim of the tube extending over the rim in the manner of a skirt. If the plug is insertless, the plug is engaged with the tube at the land, the land then extending over the tube. Once the plug and the tube are engaged the joint is produced by setting an electrode adjacent the junction of the outer extension and the land, producing an arc between the electrode and the junction and moving the electrode and the tube and plug relative to each other so that the arc traverses the junction producing the seal. An important feature of this practice is that the joint is produced not by welding along the junction between the plug and the tube but along the plug at the junction between the land and the outer extension.

To minimize the build-up of the weld metal in situations using the insert type plugs, the inner extension is grooved and as the arc fuses the material of the plug, this material runs into the groove and does not build-up on the outside of the plug. In the practice of this invention in producing a large number of welds it has been found that build-up may, in this way, be eliminated.

The welding in accordance with this invention has proved highly successful in the welding of stainless steel sealed-tube assemblies. In particular, this welding has been carried out with stainless steel AISI 347, AISI 348 and AISI 304.

The novel features considered characteristic of this invention are disclosed generally above. This invention both as to its organization and as to its method of operation and practice, together with additional objects and advantages thereof will be better understood from the following description of specific embodiments taken in connection with the accompanying drawings, in which.

In accordance with the teachings of the prior-art the assembly includes a tube T closed by a plug P. The tube T and plug P are both of generally cylindrical form, the tube T being a hollow cylinder. The plug P is of the insert type and has an inner extension IE and an outer extension OE. The inner extension terminates in a shoulder which is egaged by the rim of the tube T. The weld W is produced at the junction of the shoulder S and the rim of the tube T.

Figure 4:
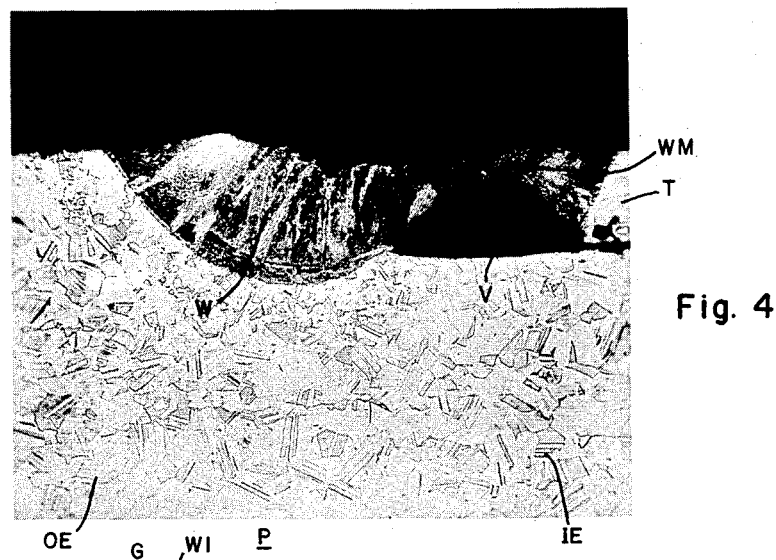
FIG. 4 is a copy of a photomicrograph of a weld in accordance with the teachings of the prior-art.

A typical difficulty with an assembly of this type is shown in FIG. 4 which is a copy of a photomicrograph of a weld of a plug P of 304 stainless steel and a tube T of 348 steel produced in accordance with the teachings of the prior-art. This photomicrograph shows that the joint has a void V produced by the shrinking away of the weld metal WM of the tube from the inner extension IE. This void would show up only after a radiograph had been produced of the assembly. In the meantime, the operator is faced with either of two impossible contingencies: to wait until the photomicrograph is completed or to proceed and possibly produce a number of unsound welds which will be discovered when the radiograph is completed.

Figure 1:
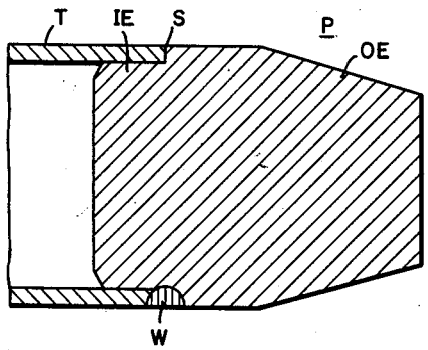
FIGURE 1 is a view in cross-section showing diagrammatically the principal features of a sealed tube assembly in accordance with the teachings of the prior-art.
Figure 2:
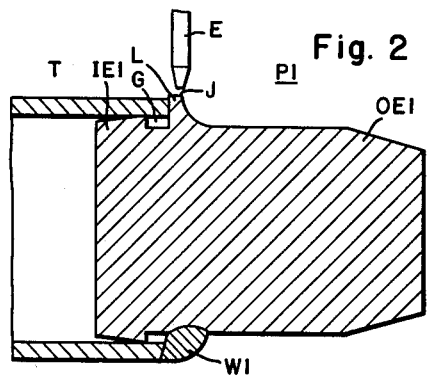
FIG. 2 is a view in section showing digrammatically such an assembly or article in accordance with this invention.

The assembly in accordance with this invention is shown in FIG. 2. In this case, the plug P1 is of the insert type and includes an outer extension OE1 and an inner extension IE1. The inner extension may be slightly tapered inwardly from the joint of the inner extension IE1 and the tube T. A land or skirt L is interposed between the inner and outer extension. The rim of the tube T engages the skirt L with the skirt extending beyond the tube. The inner extension IE1 is provided with a groove G extending inwardly from the land L. The weld W1 is in this case produced at the junction J of the land L and the outer extension OE1. The electrode E may be positioned with its axis perpendicular to the axis of the tube T and plug P1.

The electrode E is usually of the thoriated-tungsten type. The joint is produced by rotating either the electrode relative to the tube T and plug P1 or the tube and plug relative to the electrode while maintaining an arc between the electrode and the junction J. The weld has the general form of the weld W1 shown in FIG. 2 but there is substantially no build-up of metal. Excess metal runs into the groove G rather than building up outwardly.

Figure 5:
FIG. 5 is a copy of a photomacrograph of a weld in accordance with this invention in which the plug is of the insert type.
Figure 6:
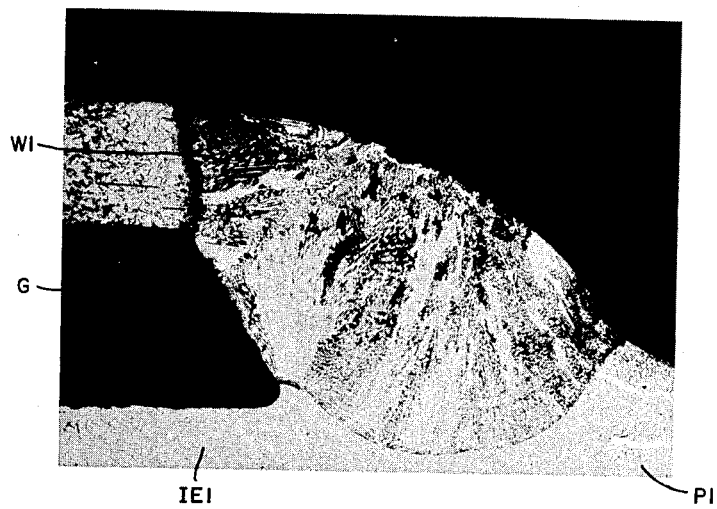
FIGS. 6 and 7 are copies of photomicrographs of the weld shown in FIG. 5.
Figure 7:
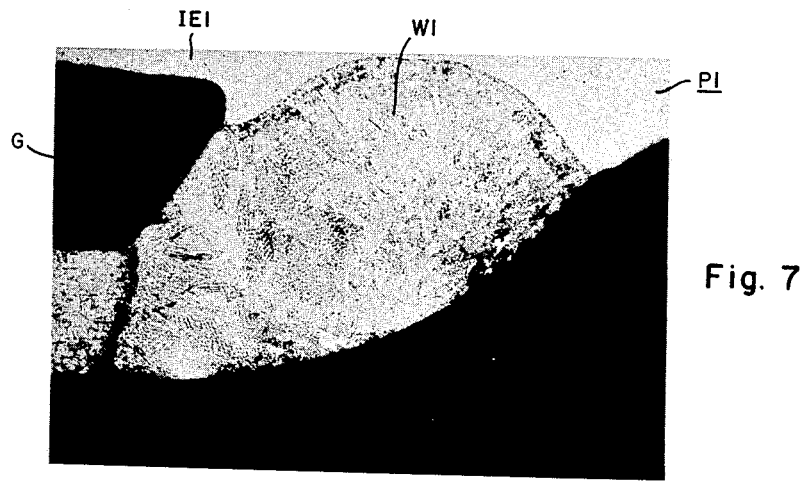

FIGS. 5, 6 and 7 show actual welds produced in the practice of this invention with the assembly component shown in FIG. 2. In this case, again, the plug was of 304 stainless steel and the tube of 348 stainless steel.

Figure 3:
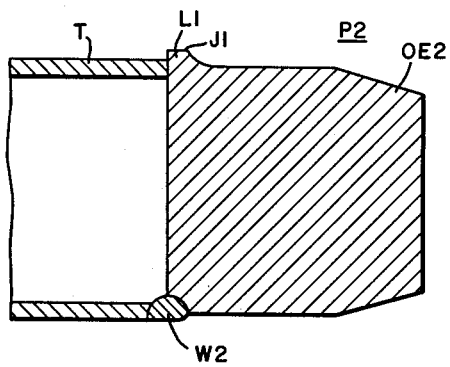
FIG. 3 is a diagrammatic view in section showing an article in accordance with this invention in which the plug is insertless.

FIG. 3 shows diagrammatically a weld in accordance with this invention with an insertless plug P2 which has an outward extension OE2 terminating in a land L1. In this case, again, the welding is carried out by setting the electrode opposite the junction J1 of the outward extension OE2 and the land L1 and fusing the material by maintaining an arc between this junction J1 and the non-consumable electrode while moving either the electrode or the junction so that the arc passes around the junction.

Figure 8:
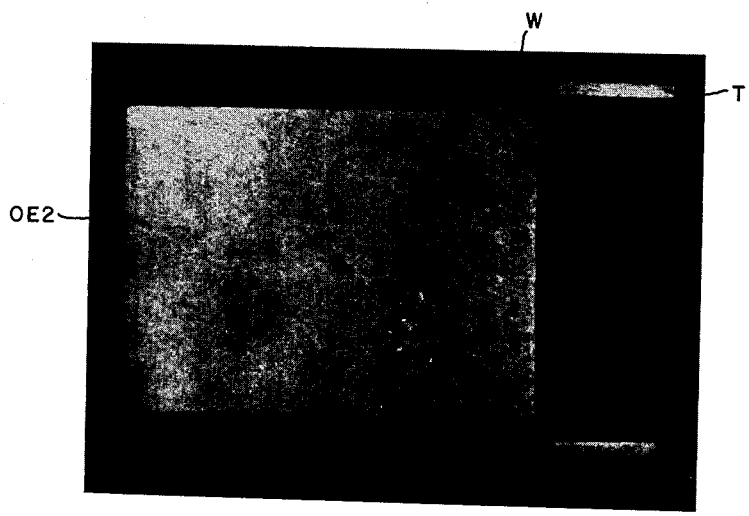
FIG. 8 is a copy of a photomacrograph of a weld including an insertless plug.
Figure 9:
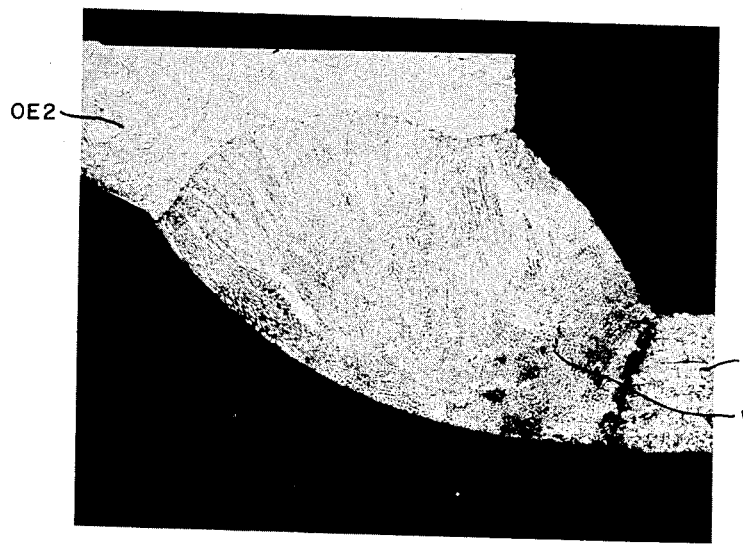
FIG. 9 is a copy of a photomicrograph of the weld shown in FIG. 8.

The resulting welds actually produced as shown in FIGS. 8 and 9. These welds were produced with a plug P2 of 304 stainless steel and a tube T of 348 stainless steel.

Figure 10:
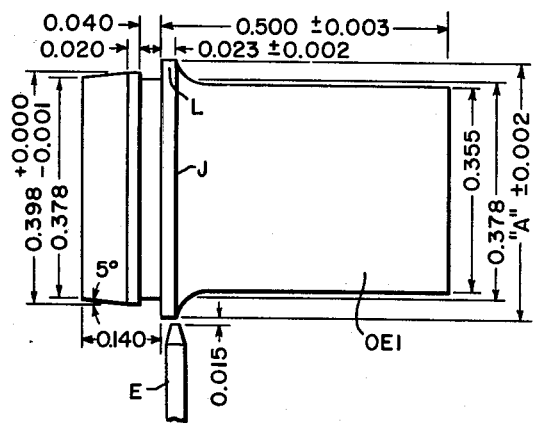
FIG. 10 is a view in side elevation of a typical insert type plug in accordance with this invention showing the various dimensions of this plug.

In the actual practice of this invention, sealed assemblies were produced with a plug P1 having the dimensions shown in FIG. 10. Such a plug P1 is used in sealing tubes having thicknesses between .015 and .019 inch and an inside diameter of .395 ±.005 inch. For the .015 tubes the land diameter is .432 ±.002 inch and for .019 this diameter is .440 ±.002 inch. The joints may be satisfactorily welded with a 2% thoriated-tungsten electrode ground to 1/16 inch diameter. The point of the electrode is ground to have a 20° taper and flattened to 1/64 of an inch. As shown in FIG. 10, this electrode E is placed about .015 inch from the junction J of the land L and the outer extension OE1.

To evaluate this invention, plugs as shown in FIG. 10 were joined to tubes by arc welding and a large number of welds were tested. The tubes were both of 304 and 347 stainless steel and the plugs were of 304 stainless steel selected to produce 3 to 5% ferrite in the welded material. The following Table I shows the chemical compositions of the tubes T and of the plugs P1.

TABLE I

| AISI Type 347 Tube | Superior Steel Co. Heat #58101 |
|---|---|
| C | 0.050 |
| Mn | 1.62 |
| P | 0.022 |
| S | 0.021 |
| Si | 0.57 |
| Ni | 10.54 |
| Cr | 18.50 |
| Cb+Ta | 0.74 |

| AISI Type 304 Tube | Superior Steel Co. Heat #C-1790 |
|---|---|
| C | 0.054 |
| Mn | 1.43 |
| P | 0.019 |
| S | 0.016 |
| Si | 0.48 |
| Ni | 10.41 |
| Cr | 18.48 |

| AISI Type 304 Plugs | Jones Q Laughlin Steel Co., #48549 |
|---|---|
| C | 0.05 |
| Mn | 1.63 |
| P | 0.022 |
| S | 0.022 |
| Si | 0.48 |
| Ni | 9.64 |
| Cr | 18.95 |
| Mo | 0.31 |
| Cu | 0.20 |
| Co | 0.06 |

Preparatory to the tests, the plugs P1 were cleaned ultrasonically for 20 minutes in "Varsol," rinsed 5 minutes in water, rinsed for a second time in acetone and dried. The tubes T were cleaned by swabbing with acetone-soaked "Q tips" and air dried. Following cleaning the plugs were pressed into the associated tubes. The samples were than stored in polyethylene bags until they were welded.

Figure 11:
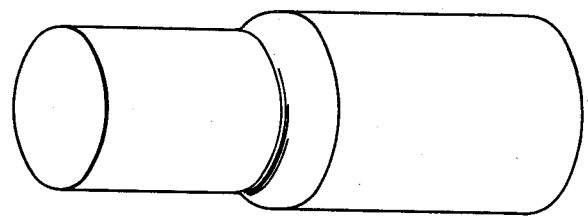
FIG. 11 is a view in perspective of a weld in accordance with this invention.

For the testing a total of 492 welds were made with 246 short-length tubes T. 420 welds were made using the insert type plug P1 of FIG. 2, while 72 welds using the insertless type plug P2, FIG. 3, were made. A typical test specimen is shown in FIG. 11. A breakdown of welds by number made, plug design, and tubing type and size is given in Table II. As indicated in Table II, the tubing was either 10, 15, or 20% cold worked.

TABLE II

*Breakdown of weld evaluation run*

INSERT PLUG

Tube material: No. of welds
347, .019" wall, 10% cold work _____ 58
347, .019" wall, 20% cold work _____ 26
304, .015" wall, 10% cold work _____ 164
304, .015" wall, 15% cold work _____ 142
304, .019" wall, 15% cold work _____ 30

Total _____ 420

INSERTLESS PLUG

Tube material: No. of welds
304, .019" wall, 22% cold work _____ 34
347, .015'" wall, 10% cold work _____ 38

Total _____ 72

The welds were made by on technician during a period of about two weeks at the rate of one or two weld runs per day. The weld parameters were as follows:

Current _____ 33–35 ampere weld using a 60–70 ampere start.
Voltage _____ 12–13 volts.
Speed of welding _____ 18 r.p.m. (24 i.p.m.).
Weld overlap to suppress crater _____ 45°.
Shielding helium flow _____ 40 c.f.h.

Variations of current and speed were introduced only when welding the 72 insertless plugs.

Welding equipment included a Westinghouse 3 phase type RA 200 Ampere D.C. Welder used in conjunction with an Airco model C arc-voltage-sensing automatic welding head. The specimens were rotated using a Jacobs chuck belt driven by a Graham variable speed drive. Gages and recorders were provided for measurement of welding parameters. The welding apparatus was wired for automatic control of the welding sequence. Adjustments were made to provide the following weld cycle.

Step 1: Specimen is inserted into the Jacobs chuck, aligned and tightened in place (manual).
Step 2: Start button is pressed (manual).
Step 3: High frequency current on (automatic).
Step 4: Weld arc starts, drive starts, high frequency current stops (automatic).
Step 5: Tube rotates for welding (automatic).
Step 6: Weld current times out at 1⅛ revolutions and drive motor stops (automatic).

Figure 12:
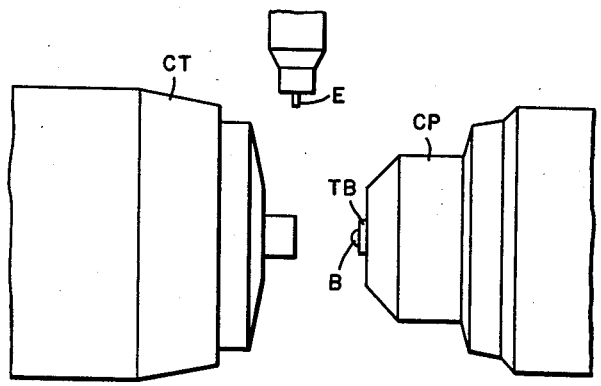
FIG. 12 is a view showing the principal components used in producing a weld of an insertless plug and tube; and, FIG. 13 is a view showing these components in the position in which they are set during a welding operation.
Figure 13:
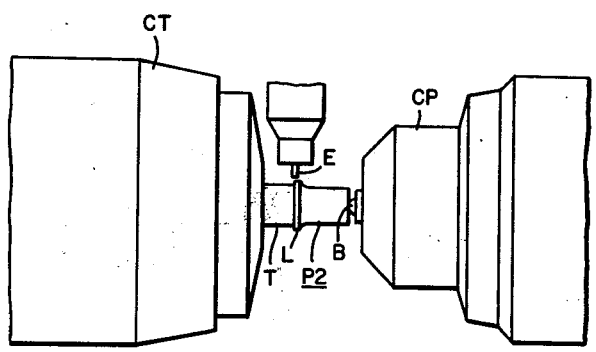

FIGS. 12 and 13 disclose the apparatus used in welding the insertless plugs P2. This apparatus includes a chuck CT for holding the tube T and a chuck CP for aligning the plug P2. The chuck CP includes a centrally mounted tube TB from which a ball B is resiliently urged outwardly by a spring (not shown). The plug P2 is set in the chuck so that it compresses the ball B against the action of the spring (not shown). The plug P2 may be held in this position by the fingers of the chuck CP. The tube T is inserted in the chuck CT and then the chucks are advanced towards each other so that the tube is engaged with the land L on the plug P2. The fingers of the chuck CP are then retracted so that the plug P2 is engaged only by the tip of the ball B. The spring pressure on the ball is adequate to hold the plug P2 against the rim of the tube T. The electrode L is then set over the junction J1 of the land L and the external extension EO2 of the plug P2. The welds are then produced as described above, the chuck CT being rotated to rotate the tube T. The plug P2 rotates with the plug because the friction between the plug P2 and the rim of the tube T is adequate to cause this rotation. Plugs P2 were seal welded to the tubes at both ends.

Each weld was inspected visually at 40× magnification, helium-leak tested to a calibrated leak rate of less than $10^{-6}$ cc./sec./atmospheres/cm., and X-rayed. Following radiography, welds were chosen for evaluation by burst tests, tensile tests, and metallography. In addition, prior to welding, the tube diameter directly adjacent to the end plug and the end plug welding land diameter were measured. Following welding the weld diameter was measured. These dimensions were used for weld buildup determination.

The method of welding in accordance with this invention was readily carried out and satisfactory articles in accordance with this invention were produced. The welds were readily reproduced, no change in welding parameters were required for the wall thickness between .015 inch and .019 inch at which the welds were carried out. The technician made all 492 welds in an interval of 2 weeks adjusting the equipment daily.

In one group of 124 welds 18 blowholes were recorded. These 18 were caused by internal gas pressure buildup during welding. All blowholes occurred in end welding of the second ends of the tubes T. Observation of the welding process indicated that the operator was welding samples rapidly enough for the delayed heating of the entrapped air within the tube T1 following first end welding to cause a delayed pressure buildup coinciding with welding of the second end. This coincidence of second-end welding and delayed internal pressure buildup would cause blowholes. A change in welding technique allowing sample cooling prior to second end welding verified this conclusion. No further blowholes occurred.

This insertless plug P2 also was satisfactorily welded over a wide range of current and voltage settings. Of the 72 welds made, one weld leaked because of non-fusion along a 1/16" length of the weld. This defect should have been detected by the operator and repaired by a second pass. The fixtures provided no restraint against angular or lateral displacement of the plug with respect to the tube during welding even though careful alignment prior to welding was provided by the fixtures. As much as 0.025 inch runout was found on several insertless plug weldment samples.

All welds were radiographed and checked for porosity, tungsten inclusions, shrinkage defects, adequate penetration and general weld configuration. Results were very satisfactory with no indications of porosity, inclusions, shrinkage or lack of penetration.

Each weld radiograph was checked for configuration on both the 0° and 90° shots. In all but 13 cases the insert plug welds had very definite fillets present in the relief groove G. Results of burst tests on these 13 samples were checked. No adverse effect was noted. Apparently the appearance of the fillet on the radiograph depends on the angle of the shot and size of the fillet. Subsequent metallography indicated that fillets are sometimes steep or slight or even reversed.

In six burst tests on 0.015" wall tubing where light fillets were noted in radiography, the failures occurred in the tubing. In four out of five such tests on 0.019" wall welds; and a heavy fillet, 4 welds. Variations in fillet configuration occurred similarly in weldments in both 0.015" and 0.019" tubing, regardless of degree of cold working or variation in material. All of the insert type plug welds sectioned were satisfactory. Five out of eight of the insertless plugs sectioned showed tube undercutting and were thus unsatisfactory in this respect.

Most of the joints measured had substantially no weld buildup. Measurement of 84 seals produced with tubes having a thickness of .019" revealed that 81% of the welds had no buildup and 96½% of the welds had a buildup of no more than .001 inch. In the case of 295 joints produced with tubes having a wall thickness of .015", 73% of the welds had no buildup and 92% of the welds had a buildup of no more than .001 inch. The buildup was affected by the dimensions of the land. The following data breaks down the above data in terms of excess of land diameter over tube diameter. Measurement of 21 joints having a land diameter exceeding the tube diameter by .004" revealed that 67% of the welds had no buildup and 81% of the welds had a buildup of no more than .001 inch. Measurement of 146 joints in which the diameter of the land exceeded the tube diameter by .005 inch revealed that 86% of the welds had no weld buildup and 97% had a buildup of no more than .001 inch. For a .006" oversize, measurement of 174 joints revealed that 72% had no buildup and 96% had buildup not exceeding .001 inch. For an oversize of .007" measurement of 46 joints revealed that 46% had no buildup and 83% had a buildup of no more than .001 inch.

Weld specimens were tested destructively by tensile and burst test to ascertain the type and locations of failures to be expected in the practice of this invention. Test data for 106 tensile tests and 108 burst tests are summarized in Table III. Each test contained two weldments, one for each end of the sample. Hence, 212 welds were tested by tensile testing and 216 welds by burst testing.

TABLE III

| Tube type | | | Plug | | Failure, ultimate stress, p.s.i. ×10⁻³ | | | | | | | | | |
| --- | --- | --- | --- | --- | --- | --- | --- | --- | --- | --- | --- | --- | --- | --- |
| | | | | | Tensile test | | | | | Burst test | | | | |
| AISI type | Wall Tk, in. | Percent C.W. | Insert type | Non insert type | Ave. | Max. | Min. | T. | W. | Ave. | Max. | Min. | T. | W. |
| 304 | .015 | 10 | X | | 105 | 106 | 103 | 46 | 0 | 123 | 134 | 105.6 | 22 | 0 |
| 304 | .015 | 15 | X | | 113 | 115 | 105.5 | 36 | a 1 | 124 | 145 | 116 | 24 | 0 |
| 347 | .015 | 10 | | X | 87 | 91 | 84 | 0 | 6 | 124 | 144 | 112 | 9 | 0 |
| 304 | .019 | 15 | X | | 113 | 115 | 112 | 2 | b 1 | 130 | 143 | 120 | 10 | 0 |
| 304 | .019 | 20 | | X | 40 | 91.5 | 88.5 | 0 | 2 | 137 | 148 | 110 | 15 | 0 |
| 347 | .019 | 10 | X | | 110 | 117 | 101 | c 1 | 7 | 127 | 142 | 106 | 17 | d 1 |
| 347 | .019 | 20 | X | | 115 | 123 | 111 | 0 | 4 | 146 | 150 | 142 | 10 | 0 | tubing the tubes failed. In the fifth the end plug weld failed but at the normal tubing burst pressure. The one weld failure was a closure on 15% cold worked type 347 tubing. The crack sensitivity of the closure weld in this material could have been a contributing factor in this failure.

Visual inspection revealed no rejectable welds other than the previously mentioned leak on the insertless plug and the group of blowholes mentioned. The helium leak test indicated no other leaks in either type of plug weldment.

Ten welds each were chosen randomly from weldments in 304, 0.015" tubing, with 10 and 15% cold working for metallographic sectioning. Four additional samples for both 304, 0.019" tubing, 15% cold working and 347, 0.019" tubing, 10% cold working were sectioned for evaluation. No previously undetected defects were discovered in metallography except in an insertless plug weldment where the weld bead tended to undercut the tube wall. Sixteen welds of the insert type out of 28 sectioned were similar in configuration to the weld shown in FIGS. 5, 6 and 7. Variations of this configuration included a steep fillet, 2 welds; a light fillet, 1 weld; reverse fillet, 5

In Table III the ultimate stress in the case of the tensile test was calculated from the $$S_{uT} = \frac{L}{A}$$

where $S_{uT}$ is the ultimate stress, L is the maximum load and A the cross-sectional area of the tube. For the burst test the ultimate stress was calculated from the equation $$U_{sB} = \frac{PD}{2t}$$

where $U_{sB}$ is the ultimate stress, P is the maximum pressure applied, D is the inside diameter of the tube and $t$ is the wall thickness of the tube.

Table III presents the maximum and minimum stresses both for tensile and the burst tests obtained for each set of measurements. These stresses are presented under the appropriately labeled columns. Thus, for 46 measurements, the maximum tensile strength measured was 106,000 lbs. per sq. inch, the minimum stress 103,000 lbs. per sq. inch and the average stress 105,000 lbs. per sq. inch. In the columns labeled T, the number of tests in which the tubes failed are given and in the column labeled W, the number of tests in which the weld failed are given. Thus, for the welds corresponding to the first row, 46 joints were subjected to tensile stress and all failed in the tube and 22 joints were subjected to burst tests and all failed in the tube. The numeral 1 bearing the label *a* in the second row of Table III records a single weld failure at 106,000 pounds per sq. inch stress. The number 1 in the fourth row labeled *b* represents a weld failure at 112,000 pounds per sq. inch. The number 1 labeled *c* in the next to the last row of Table III represents a joint which failed at 111,000 pounds per sq. inch. The number 1 labeled *d* in the next to the last row represents a weld which failed at 127,000 pounds per sq. inch.

While preferred embodiments of this invention have been disclosed herein, many modifications thereof are feasible. This invention then is not to be restricted except insofar as is necessitated by the spirit of the prior art.

We claim as our invention:

1. The method of joining a plug to a thin-walled tube by arc welding with a non-consumable electrode, the heat conduction capability of said tube being substantially lower than that of said plug by reason of the difference in thickness between said tube and plug, said plug having an axial extension from a region of which a land extends radially, the said method comprising forming a groove in said extension near the junction of said extension and land, engaging said plug and said tube with said land abutting and overhanging said tube and said extension axially inwardly of said tube, setting said electrode with its tip in a position to produce and maintain an arc between said tip and a region of said land remote from the joint between said plug and tube, producing an arc between said electrode and said junction, said arc being produced in the region of said land displaced from said tube so that said arc impinges on said land but not on any part of said tube, and moving said electrode and junction one relative to the other completely peripherally around said junction while maintaining said arc burning to fuse said land and the portion of the tube adjacent to said land to produce a welded joint, the build up of weld metal at said joint being reduced by the flow of weld metal into said groove during the welding.

2. As an article of manufacture a tube assembly including a tube closed by an end plug, said end plug having an insert extending axially inwardly in said tube and an outward extension extending axially outwardly of said tube and a land extending radially outwardly from a peripheral region of said plug intermediate said extensions and in engagement with the outer end of said tube, said tube being of relatively small massiveness compared to said plug so that the thermal conduction capability of said tube is substantially lower than the thermal conduction capability of said plug, and said plug being sealed fluid-tight to said tube by a weldment the major portion of which is comprised of the material of said land, the build up of weld metal of said weldment having been suppressed by the flow of a portion of the weld metal during the welding into said groove.

References Cited by the Examiner
UNITED STATES PATENTS

| | | | |
|---|---|---|---|
| 1,935,063 | 11/33 | Scott | 29—482 |
| 2,014,612 | 9/35 | Borton | 29—484 |
| 2,050,728 | 8/61 | Ost | 29—482 |
| 2,996,600 | 8/61 | Gardiner et al. | 29—482 |
| 3,026,130 | 3/62 | Morrell | 219—137 |

DAVID L. RECK, *Primary Examiner.*